UNITED STATES PATENT OFFICE 2,156,159

PROCESS OF MAKING LIGNIN

Edgar T. Olson, Marquette, Mich., and Raphael Katzen and Richard H. Plow, Phelps, Wis., assignors to Northwood Chemical Company, Phelps, Wis., a corporation of Wisconsin No Drawing. Application May 17, 1938, Serial No. 208,499

7 Claims. (Cl. 260—124)

This invention relates to the art of making lignin, and is particularly concerned with the making of lignin containing varying small amounts of cellulose.

According to the present process, lignin containing various amounts of cellulose is obtained from wood, corn stalks, straw, bagasse and similar lignin-cellulose containing substances. The particular lignin-cellulose-containing material to be subjected to the process is first reduced to particles which will pass thru a 5 mesh, or finer, screen. These particles are then mixed with dilute sulphuric acid solution, that is, a solution containing between about .4% and about 5% of sulphuric acid, in the ratio of between about 7 parts and about 10 parts of such dilute acid to one part of the finely divided, dry material. This mixture of acid and material is then heated for between about 2 minutes and about 5 minutes at a temperature between about 165° C. and about 280° C. at a pressure between about 90 pounds and about 100 pounds per square inch.

At the end of the heating period the pressure is reduced to atmospheric pressure. The flash vapors are preferably condensed and the furfural, formic and acetic acids contained therein are recovered. The remainder of the treated material consisting of lignin-cellulose, hexoses, pentoses, wood sugars and water is filtered to separate the lignin-cellulose materials from the other substances, the latter being subsequently treated and recovered. The lignin-cellulose materials may be washed, dried, pulverized and then used or subjected to further treatment.

Lignin-cellulose containing material of different sizes may be treated by the present process. For example, particles as large as 5 mesh size or even larger may be treated. Particles of 80 mesh size have given satisfactory results but for certain reasons it is advantageous to use even smaller particles. A convenient way to obtain the smaller particles is to grind the material and then reduce them in a colloid mill to extremely small particle size.

The following examples illustrate various specific conditions under which the present invention may be practiced.

*Example 1.*—Maple wood sawdust or flour was reduced to particles of a size which would pass thru an 80 inch mesh, or finer, screen. This material was then mixed with a 1% sulphuric acid solution in the ratio of 10 parts of such acid to 1 part of the dry wood substance contained in the sawdust. This mixture was heated for about 2 minutes at a temperature of about 180° C. under a pressure of about 150 pounds per square inch. A partially hydrolyzed wood was obtained containing between 60% and 65% of lignin and between 35% and 40% of cellulose.

*Example 2.*—Maple wood sawdust or flour was reduced to particle sizes which would pass thru an 80 mesh, or finer, screen and was then mixed with a 5% sulphuric acid solution in the ratio of 10 parts of such acid to 1 part of the dried wood substance contained in such sawdust. This mixture was heated for about 2 minutes at a temperature of about 220° C. under a pressure of about 325 pounds per square inch. The wood obtained from this treatment contained between about 75% and 80% of lignin and between about 20% and 25% of cellulose.

*Example 3.*—Maple wood sawdust or wood flour of a size which passed thru an 80 mesh, or finer, screen was mixed with a 5% sulphuric acid solution in the ratio of 10 parts of the acid to 1 part of the dry wood substance contained in the sawdust. This mixture was heated at a temperature of about 280° C. under a pressure of between 800 and 1000 pounds per square inch for between about 2 minutes and about 5 minutes. The wood material obtained from this treatment contained between 90% and 95% of lignin and between 5% and 10% of humic acids and cellulose.

In general, other hard and soft woods, corn stalks, straw, bagasse and other lignin-cellulose compounds give results comparable to those of Examples 1 to 3, when similarly treated.

In general, an increase in the strength of the sulphuric acid solution decreases the time required for hydrolysis and likewise as the temperature and pressure increase the time of hydrolysis decreases. The lignin content varies directly with the degree of hydrolysis.

It will be understood that the heating step above described may be carried out by simple apparatus. An apparatus which has been used satisfactorily consisted of a metal tube thru which the mixture to be treated was moved by a pump of conventional form capable of exerting the desired pressure on the contents of the tube. The tube was provided with an automatic pressure-release valve at the discharge end which permitted discharge of the treated material at the predetermined pressure. The tube and its contents were heated to the desired temperature by passing the tube thru an oil bath heated to the requisite temperature.

Having thus described the present invention so that others may be able to understand and practice the same, we state that what we desire to secure by Letters Patent is defined in what is claimed.

What is claimed is:

1. The process of making lignin which comprises the steps of mixing finely divided lignin-cellulose containing material with a dilute solution of sulphuric acid, containing between about .4% and about 5% of sulphuric acid, in the ratio from about 7 parts to about 10 parts of such acid to about 1 part of the dry substance, heating such mixture to between about 165 C. and about 280° C. under pressure between about 90 and 1000 pounds per square inch for between about two and about five minutes, and reducing the pressure to atmospheric.

2. The process of making lignin which comprises the steps of mixing finely divided lignin-cellulose containing material with a dilute solution of sulphuric acid, containing between about 1% and about 5% of sulphuric acid, in the ratio from about 7 parts of such acid to about 1 part of the dry substance, heating such mixture to between about 165° C. and about 280° C. under pressures varying with the temperature and ranging between about 90 and 1000 pounds per square inch for between about two and about five minutes, reducing the pressure to atmospheric, removing the vapors and recovering the lignin by filtration.

3. The process of making lignin which comprises the steps of mixing finely divided lignin-cellulose containing material with a dilute solution of sulphuric acid in the ratio from about 7 parts to about 10 parts of such acid to about 1 part of the dry substance, heating such mixture to between about 165° C. and about 280° C. under pressures between about 90 pounds and about 1000 pounds per square inch, varying with the temperature, for between about two and about five minutes, and recovering the lignin, by separation of the liquid therefrom.

4. The process of making lignin which comprises the steps of mixing lignin-cellulose containing finely divided material, with several times as many parts of a dilute solution of sulphuric acid, heating such mixture to a temperature ranging from about 165° C. upwardly with the pressure, and subjecting such mixture during such heating to a pressure ranging between about 90 and 1000 pounds per square inch for between about two and about five minutes, and reducing the pressure to atmospheric and recovering the lignin by known methods.

5. The process of making lignin which comprises the steps of mixing finely divided lignin-cellulose containing material with several times as many parts of a dilute solution of sulphuric acid, heating such mixture to about 165° C. under a pressure of about 90 pounds per square inch for between about two and about five minutes, reducing the pressure to atmospheric and recovering the lignin by known methods.

6. The process of making lignin which comprises the steps of mixing finely divided lignin-cellulose containing material with several times as many parts of dilute sulphuric acid and continuously passing such mixture thru a chamber in which the mixture is heated to between about 165° C. and about 280° C. under pressures ranging between about 90 pounds and about 1000 pounds per square inch for between about two and about five minutes, continuously discharging from said chamber the thus treated mixture.

7. The process of making lignin which comprises the steps of mixing finely divided lignin-cellulose containing material with several times as many parts of dilute sulphuric acid and continuously passing such mixture through a chamber in which the mixture is heated to between about 165° C. and about 280° C. under pressure ranging between about 90 pounds and about 1000 pounds per square inch, continuing such heating until from about 50% to about 95% of the lignin-cellulose containing material has been hydrolyzed, continuously discharging the thus treated mixture from said chamber, and recovering the lignin, by known methods.

EDGAR T. OLSON.
RAPHAEL KATZEN.
RICHARD H. PLOW.